Patented Sept. 5, 1922.

1,427,903

UNITED STATES PATENT OFFICE.

GRACE L. JOHNSTON, OF BROOKLYN, NEW YORK.

GRAPE-JUICE PRODUCT.

No Drawing. Application filed July 26, 1921. Serial No. 487,806.

*To all whom it may concern:*

Be it known that I, GRACE L. JOHNSTON, a subject of the King of Great Britain, and a resident of 17 Marlborough Road, in the borough of Brooklyn, county of Kings, State of New York, United States of America, have invented certain new and useful Improvements in Grape-Juice Products, of which the following is a specification.

My invention relates to a grape juice product which retains and improves certain desirable qualities of grape juice and which eliminates or minimizes certain undesirable characteristics. In its thicker or more concentrated form my product is especially desirable as a sauce or flavoring and in its thinner form when diluted with water it is a desirable beverage. The thicker form of my product may be diluted with four or five times its bulk of water without objectionable loss of color, appearance, flavor or palatability. With sugar at normal price, the thinner form of my product is much cheaper to produce than a corresponding quantity of concentrated grape juice; and in both cases my product is more attractive in appearance, color and taste.

When grapes are crushed and pressed the juice contains argols comprising salts of tartaric acid, particularly potash, which are gradually precipitated giving the liquid a cloudy appearance and forming a muddy sediment. In making commercial grape juice the fresh liquid is allowed to stand for several months until most of the argols have settled to the bottom after which the juice is drawn off.

In addition to the argols above referred to grape juice consists approximately of grape sugar (glucose) 16%, water 82% and a balance consisting of a number of very highly complex substances present for the most part in very small portions. These include resins, gums, albumens, mineral salts and various tannins and minute amounts of free acids, of volatile oils and of galotannic acids. The color and flavor of the grape juice is largely due to the presence in minute proportion of certain of the galotannic acids, certain if the tannins, and certain of the volatile oils. Many of these coloring and flavoring ingredients are relatively unstable and are decomposed in the presence of water alone or in a liquid containing water in large proportion. If to ordinary grape juice be added a considerable proportion of water, the liquid assumes an undesirable color and appearance, due in part to precipitation of the coloring matter. A considerable proportion of the flavoring matter will also be rendered insoluble and tasteless and the grape flavor will be diminished even disproportionately to the amount of water added.

Commercial grape juice has a purplish color and, even though the argols have been largely removed by the process above referred to, the remaining grape juice soon assumes a cloudy or thickened appearance due in part to the precipitation of some of the remaining argols that have not been eliminated by the original precipitation and drawing off of the juice. While the grape flavor is pleasing to many persons the taste of grape juice itself containing the ingredients referred to above in undiluted form is somewhat heavy and cloying and the cloudy appearance is not attractive.

In my improved product many of the desirable qualities of the grape juice are retained and intensified and certain of the undesirable characteristics are eliminated, in particular in respect to color, appearance, taste and palatability.

I have discovered that if to grape juice fruit acid and tartaric acid, or its equivalents alone or with citric acid be added and preferably also sugar certain changes will occur in the solubility of those ingredients that give desirable color and flavor to the grape juice so that if thereafter a considerable proportion of water be added, these ingredients will not lose their effect. The addition of fruit acid and sugar will reduce or prevent cloudiness in the grape juice and will so affect those ingredients which contribute color and flavor to the liquid that the subsequent addition of water even in large proportion will not cause these ingredients to lose their effect.

By adding fruit acid and preferably also sugar to grape juice, I get a thickened or concentrated product that instead of having a purplish color and a cloudy appearance has a rich garnet color and is relatively clear. This product is palatable and is desirable as a flavoring or sauce. If to this base or concentrate be added three to five times its bulk in water, there will be produced a desirable and palatable beverage which will be clear, will have an attractive ruby color, and which even in its diluted form will retain the distinctive flavor of the grape without the heavy cloying effect of the original grape juice.

The sugar used as above indicated performs several functions, including sweetening the liquid, adding body to the same, dissolving and holding in solution otherwise insoluble ingredients that would cause cloudiness and thus improving color and flavor, preventing precipitation of argols and improving the keeping quality of the product by preventing tendency to fermentation. Sucrose is the most desirable sugar to use for this purpose as it performs all of the functions above mentioned. Other forms of sugar, however, such as glucose, especially if it can be obtained sufficiently pure, may be used as they will perform some though not all of the functions.

A fruit acid added as above indicated performs several new and unexpected functions. Instead of tartaric and citric acid, malic and other fruit acids may be added. For commercial reasons, however, tartaric acid and citric acid have been found especially suitable. Among the functions performed by the addition of such fruit acid are the following: It acts as a stabilizing agent with respect to the coloring and flavoring ingredients which are thereby caused to remain soluble even when a large amount of water is added. It also masks and offsets the astringency of the grape juice due to the presence of certain of the tannins and yet does not destroy the tannins, some of which contribute materially to the distinctive flavor of the grape juice. The fruit acid adds to the brightness of the flavor, taking away what is technically known as the flat taste of the juice. It also adds to the intensity of the original color and causes the color to remain permanent. The rich garnet color of the thicker form of my product is due largely to the presence of the added fruit acid and this is also true of the ruby color of the diluted product. Some of the desirable improved characteristics of my product would result from the addition to the fruit juice of tartaric or similar fruit acid alone without the addition of sugar, but in commercial practice I consider it desirable to use sugar, particularly sucrose, in addition to and in conjunction with tartaric or similar fruit acid.

While the effects noted above may be produced by the addition of tartaric acid alone as the fruit acid, I have found that an augmented effect and more pleasing flavor is produced by the combination and addition of both tartaric and citric acids. A formula that I have found desirable in the production of my improved grape juice product is as follows:

To one gallon of grape juice add a mixture of approximately four and three quarter pounds of sugar, one ounce of tartaric acid, and one half ounce of citric acid.

It should be understood of course that the proportion of sugar in the grape juice varies with different crops of grapes and that even after the precipitation of the argols in making commercial grape juice a varying amount of tartaric acid salts remains in the juice. The proportions of sugar and of fruit acid to be added to the grape juice should be governed to a certain extent by the proportion of sugar and tartaric salts present in the grape juice to be treated. The specific gravity of grape juice varies from 8 to 10° Baumé. In carrying out my process in its preferred form I add sufficient sucrose, tartaric and citric acid to produce a base or concentrate having a specific gravity ranging from 24° to 35° Baumé. Under usual conditions I prefer to produce a base having a specific gravity of approximately 27° Baumé with an acidity calculated in terms of tartaric acid of approximately 1.3 grams per 100 c. c. The acidity, however, may range from approximately 1.00 to 1.4 or thereabouts depending upon conditions as above stated.

It will be seen that in its thicker or concentrated forms, my product can be cheaply made from grape juice and can be shipped about the country in such form and later diluted with water for use as a beverage, whereas the shipment of the product diluted with four or five times its bulk of water would involve a proportionately higher container and freight expense. My improved product has a brighter color and clearer appearance than the original grape juice and is free from cloying effect and heavy taste of the original juice; and yet it retains the distinctive and desirable flavor of the grape and the appearance and color that are associated by the public with the grape. Attempted improvement of the taste and palatability of grape juice and its color and appearance by diluting it with water is not feasible by reason of the fact that, as above pointed out, the addition of the water to a large extent gives the resulting product an undesirable appearance and deprives it largely of the distinctive grape flavor.

I have explained and illustrated my process and product in connection with certain mentioned fruit acids and sugars and with certain preferred proportions or ranges of proportions. It is obvious, however, that other equivalent fruit acids and sugars and other proportions may under varying conditions to be properly used and I therefore do not intend to limit myself to the particular fruit acids and sugars or the particular proportions above mentioned.

What I claim as new and desire to secure by Letters Patent is stated in the following claims:

1. A grape juice product comprising grape juice and a stabilizing ingredient.
2. A grape juice product comprising grape juice, a stabilizing ingredient and a large proportion of water in which the flavor and color of the grape juice remain unchanged in kind.
3. A grape juice product comprising grape juice and a stabilizing ingredient in the form of fruit acid added thereto.
4. A grape juice product comprising grape juice and tartaric acid added thereto.
5. A grape juice product containing grape juice containing only a small percentage of the argols normally present in grape juice, and having additional fruit acid.
6. A grape juice product containing grape juice from which a large percentage of the argols have been precipitated and having additional tartaric acid.
7. A grape juice product comprising grape juice, a stabilizing ingredient and a sweetening, preserving and dissolving ingredient.
8. A grape juice product comprising grape juice, tartaric acid, sugar in larger proportion than normally existing in grape juice, and a large proportion of water, in which the flavor and color of the grape juice remained unchanged in kind.
9. A grape juice product comprising grape juice, fruit acid and sugar in larger proportion than normally existing in the grape juice.
10. A grape juice product comprising grape juice, tartaric acid and sugar in larger proportion than normally existing in grape juice.
11. A grape juice product comprising grape juice and an ingredient masking the astringent qualities of the grape juice without destroying the color and flavor of the juice.
12. The process of making an improved grape juice product which consists in adding to a specified quantity of grape juice, fruit acid.
13. The process of making an improved grape juice product which consists in adding to a specified quantity of grape juice, fruit acid in an amount sufficient to give an acidity of approximately 1. to 1.4% grams per 100 c. c. calculated in terms of tartaric acid.
14. The process of making an improved grape juice product which consists in adding to a specified quantity of grape juice tartaric acid and sugar.
15. The process of making an improved grape juice product which consists in adding to a specified quantity of grape juice, fruit acid, sugar and afterwards water.
16. The process of making an improved grape juice product which consists in adding to grape juice an astringency masking ingredient.
17. A grape juice product comprising grape juice and a combination of fruit acids added thereto.
18. A grape juice product comprising grape juice, tartaric acid, critic acid, and sugar.
19. The process of making an improved grape juice product which comprises adding tartaric acid, citric acid and sugar, to grape juice.

GRACE L. JOHNSTON.